(12) United States Patent
Higuchi (10) Patent No.: US 11,306,439 B2
(45) Date of Patent: Apr. 19, 2022

(54) FIBER MATERIAL ACCUMULATING APPARATUS AND SHEET MANUFACTURING APPARATUS

(71) Applicant: SEIKO EPSON CORPORATION, Tokyo (JP)

(72) Inventor: Naotaka Higuchi, Fujimi-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 108 days.

(21) Appl. No.: 16/699,194

(22) Filed: Nov. 29, 2019

(65) Prior Publication Data

US 2020/0173106 A1 Jun. 4, 2020

(30) Foreign Application Priority Data

Nov. 30, 2018 (JP) .............................. JP2018-225995

(51) Int. Cl.
| | | |
|---|---|---|
| *D21F 7/00* | (2006.01) | |
| *D04H 1/72* | (2012.01) | |
| *D21F 1/80* | (2006.01) | |
| *D04H 1/736* | (2012.01) | |
| *D04H 1/732* | (2012.01) | |

(52) U.S. Cl.
CPC .............. *D21F 7/00* (2013.01); *D04H 1/732* (2013.01); *D04H 1/736* (2013.01); *D21F 1/80* (2013.01)

(58) Field of Classification Search
CPC . D21F 7/00; D21F 9/00; D21F 1/0018; D21F 1/0027; D21F 1/80; D04H 1/72; D04H 1/736; D04H 1/732; D04H 1/58; D01G 11/04; D21B 1/061
See application file for complete search history.

(56) References Cited

U.S. PATENT DOCUMENTS

| | | | | |
|---|---|---|---|---|
| 2,931,076 A | * | 4/1960 | Clark ...................... | D04H 1/732 264/518 |
| 3,886,629 A | * | 6/1975 | Nakai ...................... | D04H 1/72 425/83.1 |
| 3,984,898 A | | 10/1976 | Matsumura et al. | |
| 4,144,619 A | * | 3/1979 | White ...................... | D01G 25/00 19/304 |
| 4,180,378 A | * | 12/1979 | Mielke ...................... | D04H 1/72 425/83.1 |
| 4,278,113 A | * | 7/1981 | Persson ................... | D04H 1/736 141/1 |
| 7,093,718 B2 | | 8/2006 | Kato et al. | |

(Continued)

FOREIGN PATENT DOCUMENTS

| | | |
|---|---|---|
| JP | S48-036463 A | 5/1973 |
| JP | S48-072474 A | 9/1973 |
| JP | S60-220173 A | 11/1985 |

(Continued)

*Primary Examiner* — Eric Hug
(74) *Attorney, Agent, or Firm* — Oliff PLC (57) ABSTRACT

A fiber material accumulating apparatus which includes a storage section including a porous screen, a supply section which supplies a material containing fibers to the storage section, and a rotating body which is provided inside the storage section and includes a blade which rotates to agitate the material, in which the blade includes an extending portion extending along a rotational axis of the rotating body, and an opening through which the material passes when the blade rotates.

10 Claims, 9 Drawing Sheets

(56) References Cited

U.S. PATENT DOCUMENTS

2016/0138194 A1* 5/2016 Kay .................... D01D 7/00
264/171.13

FOREIGN PATENT DOCUMENTS

| JP | S61-212344 A | 9/1986 |
| JP | H03-131372 A | 6/1991 |
| JP | H11-244784 A | 9/1999 |
| JP | 3492676 B2 | 2/2004 |
| JP | 2010-207749 A | 9/2010 |

* cited by examiner

FIBER MATERIAL ACCUMULATING APPARATUS AND SHEET MANUFACTURING APPARATUS

The present application is based on, and claims priority from JP Application Serial Number 2018-225995, filed Nov. 30, 2018, the disclosure of which is hereby incorporated by reference herein in its entirety.

BACKGROUND

1. Technical Field

The present disclosure relates to a fiber material accumulating apparatus and a sheet manufacturing apparatus.

2. Related Art

In a sheet manufacturing apparatus of the related art, a so-called wet system in which water is introduced to a feedstock containing fibers, defibration is performed using mainly mechanical action, and the result is re-spread into sheets. In such a wet system sheet manufacturing apparatus, a large amount of water is necessary and the apparatus becomes large. On top of servicing maintenance of a water processing facility being laborious, a large amount of energy is used on a drying process.

Therefore, there is proposed a dry system sheet manufacturing apparatus in which water usage is avoided as much as possible in order to reduce size and achieve low energy consumption. For example, JP-A-48-36463 discloses an apparatus which defibrates a feedstock using a dry system, causes the defibrated matter to accumulate, and shapes the defibrated matter into a sheet shape. In this apparatus, the accumulating section which causes the defibrated matter to accumulate includes a housing, a cylindrical screen, and a rotating body which rotates in an inside of the screen, the screen being provided inside the housing and configured by a porous body. The defibrated matter supplied to the inside of the screen passes through the screen while being untangled inside the screen by the rotation of the rotating body, is dispersed in a gas, and accumulates on a belt. Accordingly, a web is formed.

In the apparatus described in JP-A-48-36463, the rotating body which rotates inside the screen includes a shaft and a plurality of blade units joined to the shaft. Each of the blade units is disposed concentrically along a longitudinal direction of the shaft. The blade unit is configured such that a plurality of blades is joined to the shaft in a radial shape. The blade units rotate due to the shaft rotating, and at this time, the blade units come into contact with the defibrated matter inside the screen and agitate the defibrated matter.

However, in the apparatus described in JP-A-48-36463, when the rotating body rotates, the defibrated matter inside the screen may be moved in lumps and it is difficult to perform the agitation well. In other words, the fibers of the defibrated matter may not be untangled from each other well and so-called clumps of a state in which the fibers are tangled with each other. When the clumps are formed, the amount, that is, the dispersion amount of the fibers passing through the screen does not stabilize and accumulated matter having a uniform thickness may not be obtained.

SUMMARY

The present disclosure can be realized in the following aspects or application examples.

According to an aspect of the present disclosure, there is provided a fiber material accumulating apparatus which includes a storage section including a porous screen, a supply section which supplies a material containing fibers to the storage section, and a rotating body which is provided inside the storage section and includes a blade which rotates to agitate the material, in which the blade includes an extending portion extending along a rotational axis of the rotating body, and an opening through which the material passes when the blade rotates.

According to another aspect of the present disclosure, there is provided a sheet manufacturing apparatus including the fiber material accumulating apparatus according to the present disclosure, and a shaping section which shapes accumulated matter formed by the fiber material accumulating apparatus into a sheet shape.

DESCRIPTION OF EXEMPLARY EMBODIMENTS

Hereinafter, a detailed description will be given of a fiber material accumulating apparatus and a sheet manufacturing apparatus of the present disclosure based on favorable embodiments which are illustrated in the attached drawings.

First Embodiment

Figure 1:
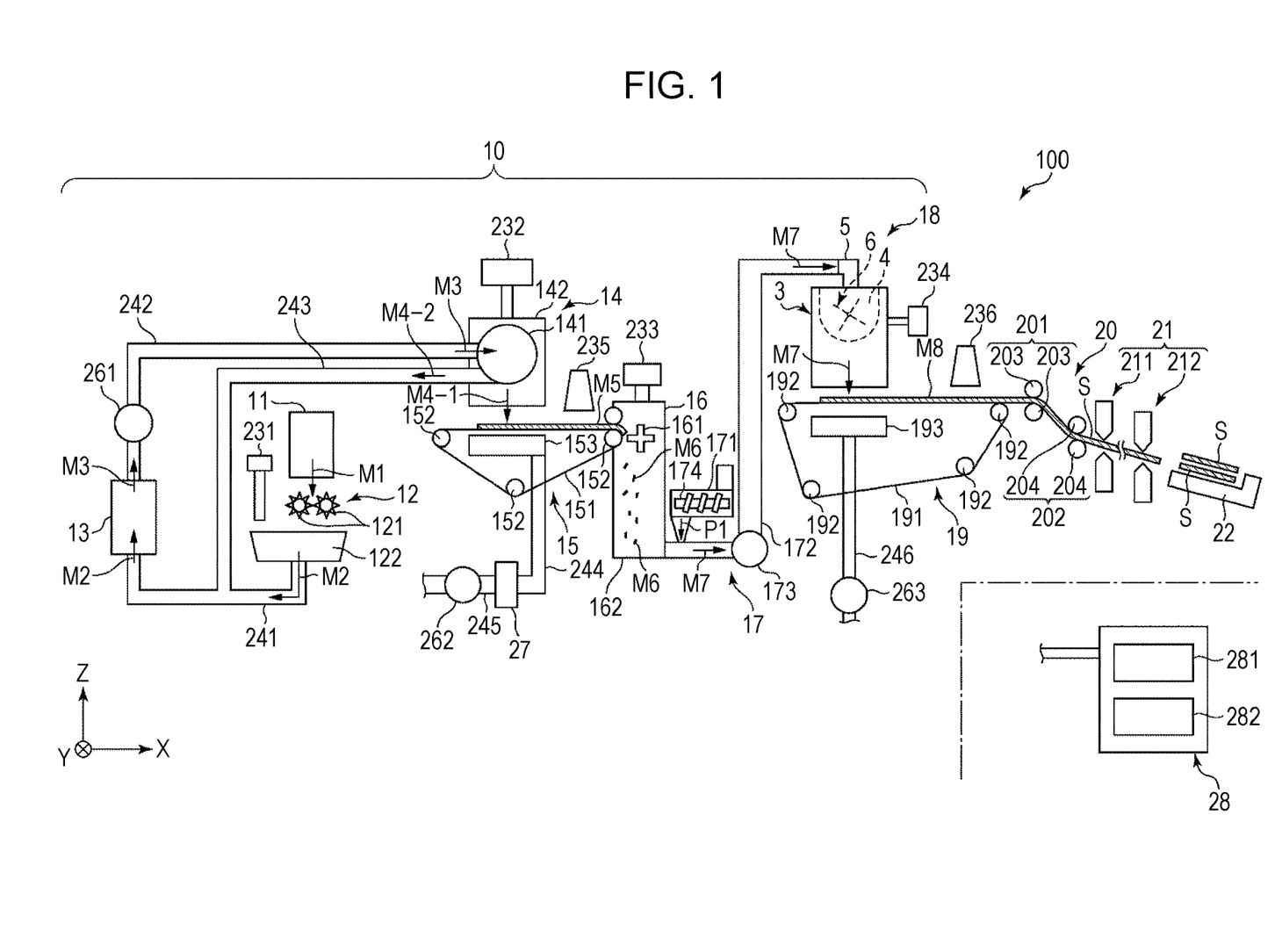
FIG. 1 is a schematic side view illustrating a first embodiment of a fiber material accumulating apparatus and a sheet manufacturing apparatus of the present disclosure.
Figure 2:
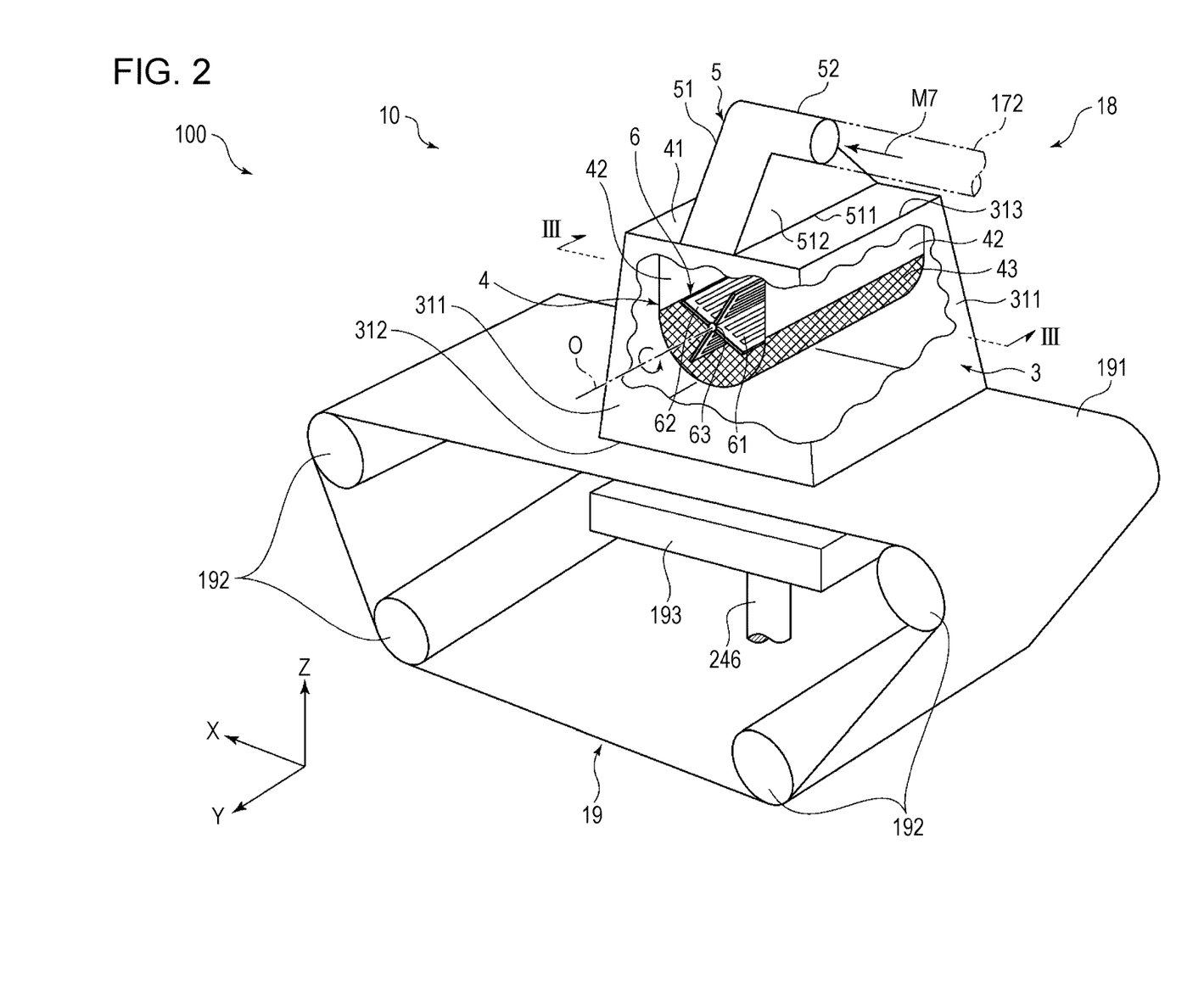
FIG. 2 is a perspective view illustrating a dispersing section and a second web forming section illustrated in FIG. 1.
Figure 3:
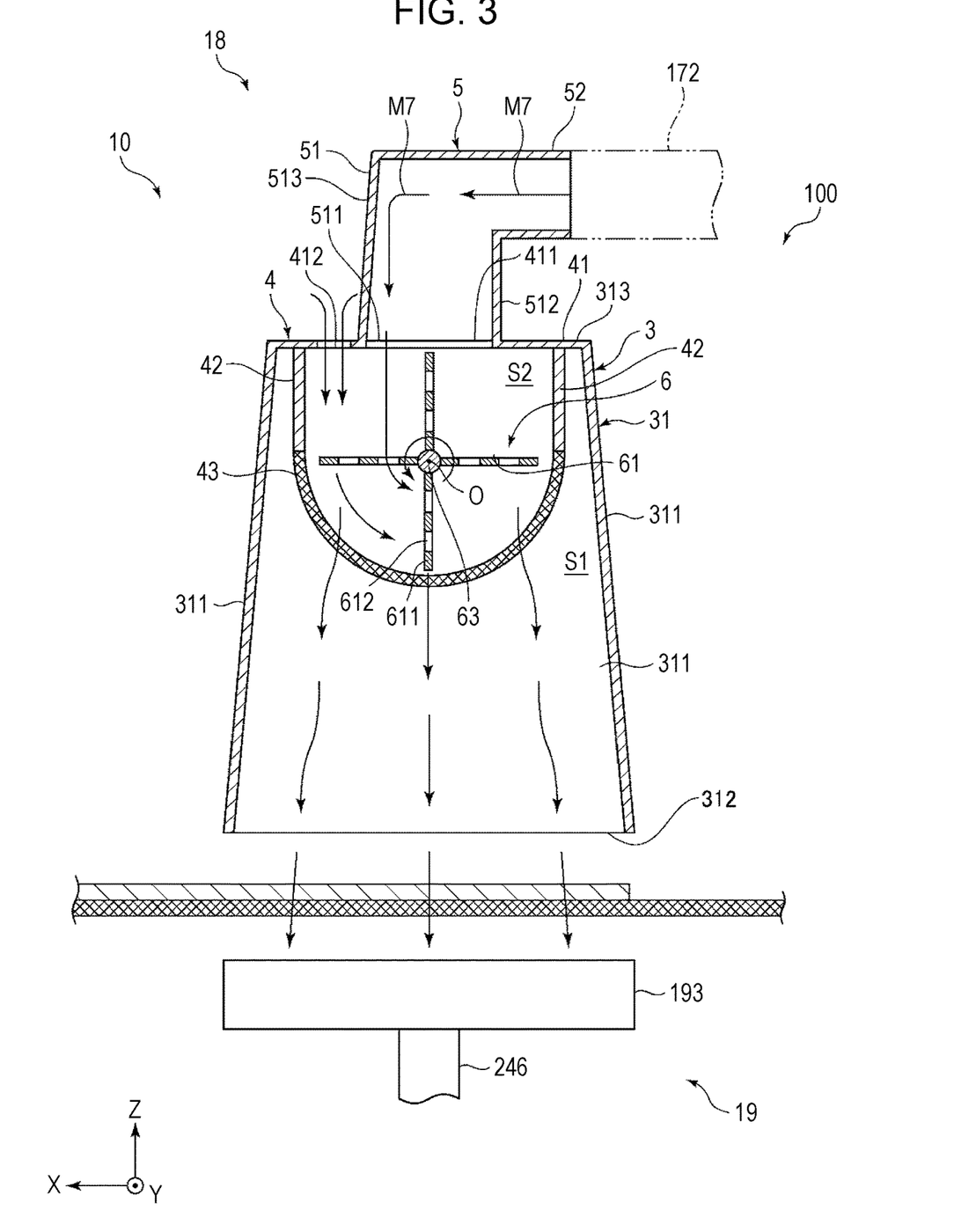
FIG. 3 is a sectional diagram taken along a line III-III in FIG. 2.
Figure 4:
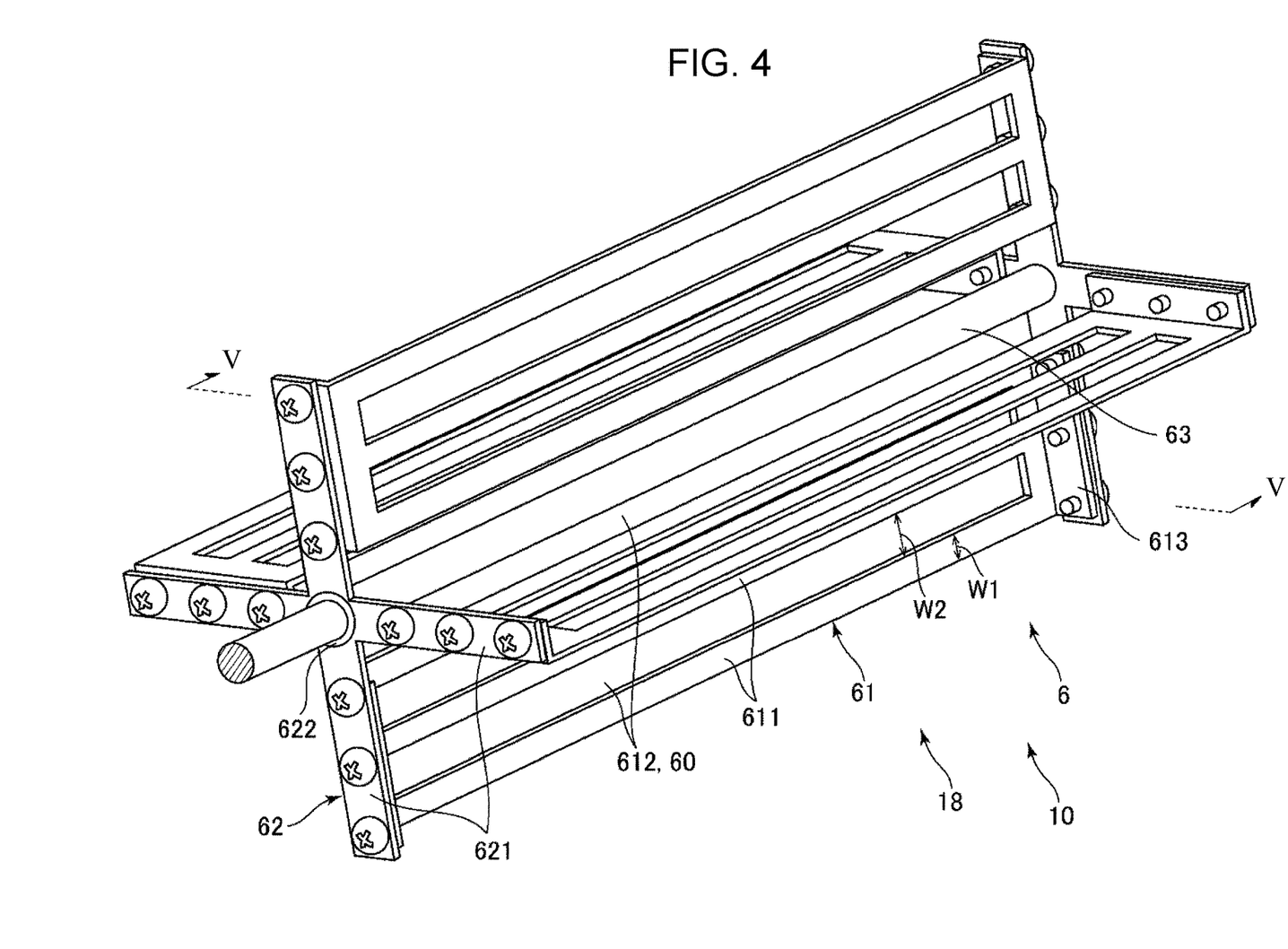
FIG. 4 is a perspective view of a rotating body which is provided in the dispersing section illustrated in FIG. 1.
Figure 5:
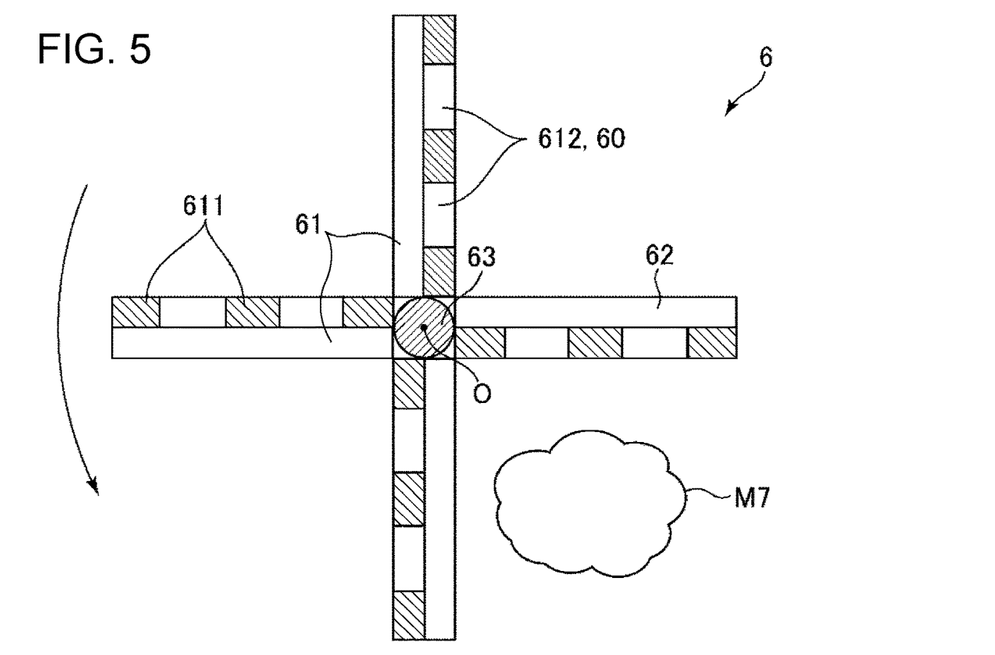
FIG. 5 is a sectional diagram taken along a line V-V in FIG. 4.
Figure 6:
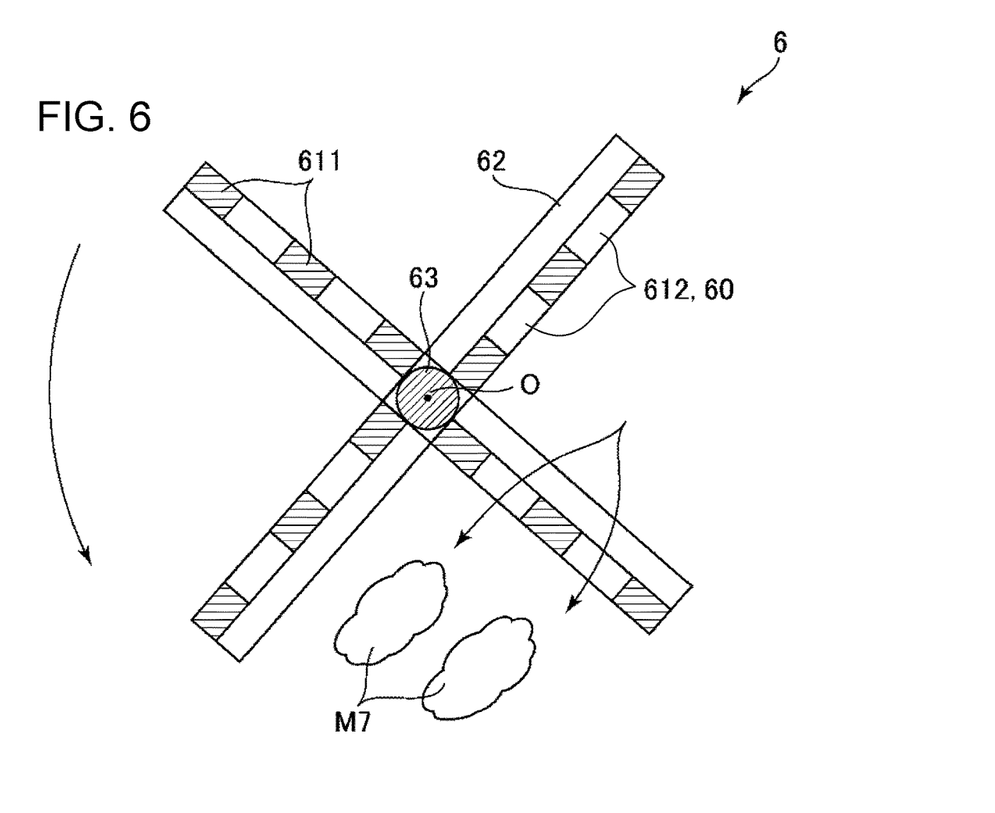
FIG. 6 is a sectional diagram in which the rotating body is rotated from the state illustrated in FIG. 5.

FIG. 1 is a schematic side view illustrating a first embodiment of a fiber material accumulating apparatus and a sheet manufacturing apparatus of the present disclosure. FIG. 2 is a perspective view illustrating a dispersing section and a second web forming section illustrated in FIG. 1. FIG. 3 is a sectional diagram taken along a line III-III in FIG. 2. FIG. 4 is a perspective view of a rotating body which is provided in the dispersing section illustrated in FIG. 1. FIG. 5 is a sectional diagram taken along a line V-V in FIG. 4. FIG. 6 is a sectional diagram in which the rotating body is rotated from the state illustrated in FIG. 5.

Hereinafter, to facilitate explanation, three axes orthogonally intersecting each other will be an x-axis, a y-axis, and a z-axis as illustrated in FIGS. 1 to 3. An xy plane including the x-axis and the y-axis is horizontal and the z-axis is vertical. The directions in which the arrows of each axis face will be referred to as "+" and the opposite directions will be referred to as "−". The top side of FIG. 1 will be referred to as "the top" or "above", and the bottom side will be referred to as "the bottom" or "below". In FIG. 1, the left side may be referred to as "upstream" and the right side may be referred to as "downstream".

As illustrated in FIGS. 1 and 2, a sheet manufacturing apparatus 100 is provided with a fiber material accumulating apparatus 10, a sheet shaping section 20, a cutting section 21, a stock section 22, and a collecting section 27. The fiber material accumulating apparatus 10 is provided with a feedstock supply section 11, a crushing section 12, a defibrating section 13, a sorting section 14, a first web forming section 15, a subdividing section 16, a mixing section 17, a dispersing section 18, a second web forming section 19, and a control section 28.

As illustrated in FIGS. 1 and 2, the sheet manufacturing apparatus 100 is provided with a humidifying section 231, a humidifying section 232, a humidifying section 233, a humidifying section 234, a humidifying section 235, and a humidifying section 236. Additionally, the sheet manufacturing apparatus 100 is provided with a blower 173, a blower 261, a blower 262, and a blower 263.

In the sheet manufacturing apparatus 100, a feedstock supplying process, a crushing process, a defibrating process, a sorting process, a first web forming process, a dividing process, a mixing process, a dispersing process, a second web forming process, a sheet shaping process, and a cutting process are executed in this order.

Hereinafter, a description will be given of the configurations of each part.

As illustrated in FIG. 1, the feedstock supply section 11 is a portion which performs the feedstock supplying process of supplying a feedstock M1 to the crushing section 12. It is possible to use a sheet-like material formed from fiber-containing matter containing cellulose fibers for the feedstock M1. The cellulose fibers may have the compound cellulose as the main component and be fibrous, and may include, in addition to the cellulose, hemicellulose and lignin. The form of the feedstock M1, such as woven textiles and non-woven textiles, is unimportant. The feedstock M1 may be recycled paper which is manufactured by defibrating and recycling old paper, Yupo paper (registered trademark) which is synthetic paper, and may not be recycled paper. In the present embodiment, the feedstock M1 is old paper that is used or is no longer necessary.

The crushing section 12 is the portion which performs the crushing process of crushing the feedstock M1 supplied from the feedstock supply section 11 in a gas such as the atmosphere. The crushing section 12 includes a pair of crushing blades 121 and a chute 122.

The pair of crushing blades 121 is capable of crushing, that is, cutting the feedstock M1 between the crushing blades 121 by rotating in opposite directions from each other to form crushed pieces M2. The shape and size of the crushed pieces M2 are preferably suitable for the defibrating process in the defibrating section 13, for example, fragments in which the length of one side is less than or equal to 100 mm are preferable, and fragments in which the length of one side is 10 mm to 70 mm are more preferable.

The chute 122 is disposed below the pair of crushing blades 121 and is funnel shaped, for example. Accordingly, the chute 122 is capable of receiving the crushed pieces M2 which are crushed by the crushing blades 121 and fall down.

The humidifying section 231 is disposed adjacent to the pair of crushing blades 121 above the chute 122. The humidifying section 231 humidifies the crushed pieces M2 inside the chute 122. The humidifying section 231 is configured by a humidifier of a vaporizing system, in particular, a warm air vaporizing system which includes a filter (not illustrated) including a water content in which humidified air having a heightened humidity is supplied to the crushed pieces M2 by passing air through the filter. It is possible to suppress the adherence of the crushed pieces M2 to the chute 122 and the like due to static electricity by supplying the humidified air to the crushed pieces M2.

The chute 122 is connected to the defibrating section 13 via a tube 241. The crushed pieces M2 gathered in the chute 122 pass through the tube 241 and are transported to the defibrating section 13.

The defibrating section 13 is a portion which performs the defibrating process which defibrates the crushed pieces M2 in a gas, that is, in a dry system. It is possible to generate defibrated matter M3 from the crushed pieces M2 through the defibrating process of the defibrating section 13. Here, "to defibrate" refers to untangling the crushed pieces M2, each of which is formed by a plurality of fibers being bonded together, into individual fibers. The untangled result is the defibrated matter M3. The shape of the defibrated matter M3 is string-shaped or loop-shaped. The defibrated matter M3 may be present in a state of being tangled with each other to form lumps, that is, may be present in a state of forming so-called "clumps".

For example, in the present embodiment, the defibrating section 13 is configured by an impeller mill including a rotor which rotates at high speed and a liner positioned on the outer circumference of the rotor. The crushed pieces M2 which flow into the defibrating section 13 are interposed between the rotor and the liner and are defibrated.

The defibrating section 13 is capable of generating a flow of air, that is, an air current from the crushing section 12 toward the sorting section 14 through the rotation of the rotor. Accordingly, it is possible to suction the crushed pieces M2 from the tube 241 to the defibrating section 13. After the defibrating process, it is possible to pump out the defibrated matter M3 to the sorting section 14 via the tube 242.

The blower 261 is installed in the middle of the tube 242. The blower 261 is an air current generating device which generates an air current heading toward the sorting section 14. Accordingly, the pumping out of the defibrated matter M3 to the sorting section 14 is promoted.

The sorting section 14 is a portion which performs the sorting process of sorting defibrated matter M3 by magnitude of fiber length. In the sorting section 14, the defibrated matter M3 is sorted into first sorted matter M4-1 and second sorted matter M4-2 which has larger than those of the first sorted matter M4-1. The first sorted matter M4-1 has a size suitable for the subsequent manufacturing of the sheet S. It is preferable that the average length be 1 μm to 30 μm. Meanwhile, the second sorted matter M4-2 contains the defibrating is insufficient, the defibrated fibers are excessively agglomerated to each other, and the like, for example.

The sorting section 14 includes a drum section 141 and a housing section 142 housing the drum section 141.

The drum section 141 is configured by a cylindrical mesh body and is a sieve which rotates around a center axis. The defibrated matter M3 flows into the drum section 141. Due to the rotation of the drum section 141, the defibrated matter M3 is smaller than the aperture of the mesh is sorted as the first sorted matter M4-1 and the defibrated matter M3 having a size greater than or equal to the aperture of the mesh is sorted as the second sorted matter M4-2.

The first sorted matter M4-1 falls from the drum section 141.

Meanwhile, the second sorted matter M4-2 is pumped out to a tube 243 connected to the drum section 141. The opposite side of the tube 243 from the drum section 141, that is, the upstream side is connected to the tube 241. The second sorted matter M4-2 which passes through the tube 243 flows to join the crushed pieces M2 inside the tube 241 and flows into the defibrating section 13 together with the crushed pieces M2. Accordingly, the second sorted matter M4-2 is returned to the defibrating section 13 and is subjected to the defibrating process together with the crushed pieces M2.

The first sorted matter M4-1 from the drum section 141 falls while being dispersed in a gas and heads for the first web forming section 15 positioned beneath the drum section 141. The first web forming section 15 is a portion which performs the first web forming process of forming a first web M5 from the first sorted matter M4-1. The first web forming section 15 includes a mesh belt 151, three stretch rollers 152, and a suction section 153.

The mesh belt 151 is an endless belt and the first sorted matter M4-1 accumulates thereon. The mesh belt 151 is wrapped around the three stretch rollers 152. The first sorted matter M4-1 on the mesh belt 151 is transported downstream by the rotational driving of the stretch rollers 152.

The first sorted matter M4-1 are of a size greater than or equal to the aperture of the mesh belt 151. Accordingly, the first sorted matter M4-1 is restricted from passing through the mesh belt 151, and thus, is capable of accumulating on the mesh belt 151. Since the first sorted matter M4-1 is transported downstream together with the mesh belt 151 while accumulating on the mesh belt 151, the first sorted matter M4-1 is formed as the layer-shaped first web M5.

There is a concern that dirt, dust, and the like may be mixed into the first sorted matter M4-1, for example. The dirt and dust may be generated by the crushing and the defibrating, for example. The dirt and dust are collected in the collecting section 27 (described later).

The suction section 153 is a suction mechanism which suctions the air from below the mesh belt 151. Accordingly, it is possible to suction the dirt and dust which pass through the mesh belt 151 together with the air.

The suction section 153 is connected to the collecting section 27 via a tube 244. The dirt and dust suctioned by the suction section 153 is collected in the collecting section 27.

A tube 245 is further connected to the collecting section 27. The blower 262 is installed in the middle of the tube 245. It is possible to generate a suction force in the suction section 153 using the operation of the blower 262. Accordingly, the formation of the first web M5 on the mesh belt 151 is promoted. The first web M5 has the dirt, dust, and the like removed. The dirt and dust pass through the tube 244 and reach the collecting section 27 due to the operation of the blower 262.

The housing section 142 is connected to the humidifying section 232. The humidifying section 232 is configured by a vaporizing humidifier similar to the humidifying section 231. Accordingly, the humidified air is supplied into the housing section 142. It is possible to humidify the first sorted matter M4-1 using the humidified air, and thus, it is possible to suppress the adherence of the first sorted matter M4-1 to the inner walls of the housing section 142 caused by static electricity.

The humidifying section 235 is disposed downstream of the sorting section 14. The humidifying section 235 is configured by an ultrasonic wave humidifier which sprays a mist of water. Accordingly, it is possible to supply water content to the first web M5, and thus, the water content amount of the first web M5 is adjusted. According to the adjustment, it is possible to suppress the adherence of the first web M5 to the mesh belt 151 caused by static electricity. Accordingly, the first web M5 is easily peeled from the mesh belt 151 at a position at which the mesh belt 151 doubles back at the stretch roller 152.

The subdividing section 16 is disposed downstream of the humidifying section 235. The subdividing section 16 is a portion which performs the dividing process of dividing the first web M5 which separates from the mesh belt 151. The subdividing section 16 includes a propeller 161 supported to be capable of rotating and a housing section 162 housing the propeller 161. It is possible to divide the first web M5 using the propeller 161 which rotates. The first web M5 which is divided becomes subdivided matter M6. The subdivided matter M6 falls inside the housing section 162.

The housing section 162 is connected to the humidifying section 233. The humidifying section 233 is configured by a vaporizing humidifier similar to the humidifying section 231. Accordingly, the humidified air is supplied into the housing section 162. It is also possible to suppress the adherence of the subdivided matter M6 to the inner walls of the propeller 161 and the housing section 162 caused by static electricity using the humidified air.

The mixing section 17 is disposed downstream of the subdividing section 16. The mixing section 17 is a portion which performs the mixing process of mixing the subdivided matter M6 and a resin P1. The mixing section 17 includes a resin supply section 171, a tube 172, and the blower 173.

The tube 172 connects the housing section 162 of the subdividing section 16 and the dispersing section 18 to each other and is a flow path through which a mixture M7 of the subdivided matter M6 and the resin P1 pass.

The resin supply section 171 is connected to the middle of the tube 172. The resin supply section 171 includes a screw feeder 174. The screw feeder 174 is capable of supplying the resin P1 to the tube 172 as a powder or as granules through rotational driving. The resin P1 supplied to the tube 172 is mixed with the subdivided matter M6 to form the mixture M7.

The resin P1 bonds the fibers to each other in the subsequent process. For example, it is possible to use a thermoplastic resin, a curable resin, or the like for the resin P1, and it is preferable to use a thermoplastic resin. Examples of the thermoplastic resin include polyolefins such as AS resin, ABS resin, polyethylene, polypropylene, ethylene-vinyl acetate copolymer (EVA), acrylic resins such as modified polyolefin and polymethyl methacrylate, polyesters such as polyvinyl chloride, polystyrene, polyethylene terephthalate, and polybutylene terephthalate, polyamides (nylons) such as nylon 6, nylon 46, nylon 66, nylon 610, nylon 612, nylon 11, nylon 12, nylon 6-12, and nylon 6-66, liquid crystal polymers such as polyphenylene ether, polyacetal, polyether, polyphenylene oxide, polyether ether ketone, polycarbonate, polyphenylene sulfide, thermoplastic polyimide, polyetherimide, and aromatic polyester, various thermoplastic elastomers such as styrene-based elastomers, polyolefin-based elastomers, polyvinyl chloride-based elastomers, polyurethane-based elastomers, polyester-based elastomers, polyamide-based elastomers, polybutadiene-based elastomers, trans polyisoprene-based elastomers, fluoro rubber-based elastomers, and chlorinated polyethylene-based elastomers, and it is possible to use one kind or two or more kinds selected from these in combination. It is preferable to use polyester or a resin containing polyester as the thermoplastic resin.

For example, in addition to the resin P1, the resin supplied from the resin supply section 171 may contain a colorant for coloring the fibers, an agglomeration inhibitor for suppressing agglomeration of the fibers and agglomeration of the resin P1, a flame retardant for rendering the fibers and the like less susceptible to burning, a paper strengthening agent for increasing the paper strength of the sheet S, and the like. Alternatively, a composite including these in the resin P1 in advance may be supplied from the resin supply section 171.

The blower 173 may be provided in the middle of the tube 172 downstream of the resin supply section 171. The subdivided matter M6 and the resin P1 are mixed together by the action of a rotating portion such as blades included in the blower 173. The blower 173 is capable of generating an air current heading toward the dispersing section 18. It is possible to agitate the subdivided matter M6 and the resin P1 together inside the tube 172 using the air current. Accordingly, it is possible to cause the mixture M7 to flow into the dispersing section 18 in a state in which the subdivided matter M6 and the resin P1 are uniformly dispersed. The subdivided matter M6 inside the mixture M7 are untangled in the process of passing through the inside of the tube 172 to form a finer fiber shape.

The dispersing section 18 performs the dispersing process of untangling the material containing the fibers, that is, the fibers entangled with each other in the mixture M7 and disperses the result in a gas. A detailed description will be given later of the configuration of the dispersing section 18. The mixture M7 dispersed in the gas by the dispersing section 18 falls and heads toward the second web forming section 19 positioned under the dispersing section 18.

The second web forming section 19 is a portion which performs the second web forming process of forming a second web M8 from the mixture M7. The second web forming section 19 includes a mesh belt 191, stretch rollers 192, and a suction section 193.

The mesh belt 191 is an endless belt and the mixture M7 accumulates thereon. The mesh belt 191 is wrapped around the four stretch rollers 192. The mixture M7 on the mesh belt 191 is transported downstream by the rotational driving of the stretch rollers 192.

Most of the mixture M7 on the mesh belt 191 is of a size greater than or equal to the aperture of the mesh belt 191. Accordingly, the mixture M7 is restricted from passing through the mesh belt 191, and thus, is capable of accumulating on the mesh belt 191. Since the mixture M7 is transported downstream together with the mesh belt 191 while accumulating on the mesh belt 191, the mixture M7 is formed as the layer-shaped second web M8.

The suction section 193 is a suction mechanism which suctions the air from below the mesh belt 191. Accordingly, it is possible to suction the mixture M7 on the mesh belt 191, and thus, it is possible to accumulate the mixture M7 on the mesh belt 191.

A tube 246 is connected to the suction section 193. The blower 263 is installed in the middle of the tube 246. It is possible to generate a suction force in the suction section 193 using the operation of the blower 263.

The humidifying section 236 is disposed downstream of the dispersing section 18. The humidifying section 236 is configured by a vaporizing humidifier similar to the humidifying section 235. Accordingly, it is possible to supply water content to the second web M8, and thus, the water content amount of the second web M8 is adjusted. According to the adjustment, it is possible to suppress the adherence of the second web M8 to the mesh belt 191 caused by static electricity. Accordingly, the second web M8 is easily peeled from the mesh belt 191 at a position at which the mesh belt 191 doubled back at the stretch roller 192.

It is preferable that the total water content amount added in the humidifying section 231 to the humidifying section 236 be greater than or equal to 0.5 parts by mass and less than or equal to 20 parts by mass to 100 parts by mass of the pre-humidified material, for example.

The sheet shaping section 20 is disposed downstream of the second web forming section 19. The sheet shaping section 20 is a portion which performs the sheet shaping process of shaping the sheet S from the second web M8. The sheet shaping section 20 includes a pressurizing section 201 and a heating section 202.

The pressurizing section 201 includes a pair of calender rollers 203 and is capable of pressurizing the second web M8 between the calender rollers 203 without heating the second web M8. Accordingly, the density of the second web M8 is heightened. It is preferable that the degree of heating at this time be a degree to which the resin P1 is not melted, for example. The second web M8 is transported toward the heating section 202. One of the calender rollers 203 in the pair is a main drive roller which is driven by the operation a motor (not illustrated) and the other is a follower roller.

The heating section 202 includes a pair of heating rollers 204 and is capable of pressurizing the second web M8 between the heating rollers 204 while heating the second web M8. According to the heating and pressurizing, the resin P1 melts and the fibers are bonded to each other via the melted resin P1 inside the second web M8. Accordingly, the sheet S is formed. The sheet S is transported toward the cutting section 21. One of the heating rollers 204 in the pair is a main drive roller which is driven by the operation a motor (not illustrated) and the other is a follower roller.

The cutting section 21 is disposed downstream of the sheet shaping section 20. The cutting section 21 is a portion which performs the cutting process of cutting the sheet S. The cutting section 21 includes a first cutter 211 and a second cutter 212.

The first cutter 211 cuts the sheet S in a direction intersecting, in particular, orthogonally intersecting the transport direction of the sheet S.

The second cutter 212 cuts the sheet S in a direction parallel to the transport direction of the sheet S downstream of the first cutter 211. This cutting removes the end portions on both sides of the sheet S, that is, removes unnecessary portions of the end portions in the +y-axis direction and the −y-axis direction to straighten the width of the sheet S and the portions which are cut and removed are referred to as so-called "offcuts".

The sheet S of a desired shape and size may be obtained through the cutting of the first cutter 211 and the second cutter 212. The sheet S is transported further downstream and is deposited in the stock section 22.

The parts provided in the sheet manufacturing apparatus 100 are electrically connected to the control section 28. The operations of the parts are controlled by the control section 28.

The control section 28 includes a CPU (central processing unit) 281 and a memory section 282. The CPU 281 is capable of performing various determinations, various operations, and the like, for example.

The memory section 282 stores various programs such as a program of manufacturing the sheet S, various calibration curves, tables, and the like, for example.

The control section 28 may be embedded in the sheet manufacturing apparatus 100 and may be provided in an external device such as an external computer. There is a case in which communication with the external device is performed with the sheet manufacturing apparatus 100 via a cable or the like, for example, a case in which wireless communication is performed, a case in which a network such as the Internet, for example, is connected via the sheet manufacturing apparatus 100, and the like.

The CPU 281 and the memory section 282 may be integrated and be configured as a single unit, for example, the CPU 281 may be embedded in the sheet manufacturing apparatus 100 and the memory section 282 may be embedded in an external device such as an external computer, and the memory section 282 may be embedded in the sheet manufacturing apparatus 100 and the CPU 281 may be provided in an external device such as an external computer.

Next, a description will be given of the dispersing section 18.

As illustrated in FIGS. 2 and 3, the dispersing section 18 includes a housing 3, a storage section 4 positioned inside the housing 3, a supply section 5 which supplies the mixture M7 to the storage section 4, and a rotating body 6 provided inside the storage section 4, in which the storage section 4 disperses the stored mixture M7.

The housing 3 includes a tubular housing main body 31. The housing main body 31 includes four side walls 311. The housing main body 31 houses the storage section 4 in a space S1 surrounded by the side walls 311 and covers a portion between the storage section 4 and the mesh belt 191.

The housing main body 31 includes a bottom-side opening 312 facing the mesh belt 191 and a top-side opening 313 positioned on the opposite side. The bottom-side opening (a first opening) 312 is a release port which releases the mixture M7 dispersed from the storage section 4. The top-side opening (a second opening) 313 is covered by a top plate 41 of the storage section 4.

The dispersing section 18 includes the housing 3 which covers the space S1 which is a portion between the storage section 4 and the mesh belt 191 and the bottom-side opening 312 is formed in the housing 3 at a position facing the mesh belt 191. Accordingly, it is possible to effectively form the air current heading toward the bottom side inside the space S1 using the suction force of the suction section 193. Accordingly, it is possible to promote the accumulation of the mixture M7 dispersed from the storage section 4 onto the mesh belt 191.

As illustrated in FIG. 1, the humidifying section 234 is connected to the housing 3. The humidifying section 234 is configured by a vaporizing humidifier similar to the humidifying section 231. Accordingly, the humidified air is supplied into the housing 3. It is possible to humidify the inside of the housing 3 using the humidified air, and thus, it is possible to suppress the adherence of the dispersed mixture M7 to the inner walls of the housing 3 caused by static electricity.

The storage section 4 includes the top plate 41 blocking the top-side opening 313 of the housing 3, a pair of side walls 42 installed on the bottom side of the top plate 41, and a porous screen 43.

The top plate 41 includes a supply port 411 and a communicating port 412 provided to penetrate the top plate 41 in the thickness direction. The supply port 411 communicates with the supply section 5 and is a portion through which the mixture M7 passes. The supply port 411 has a longitudinal shape extending in the y-axis directions and is provided approximately at the middle portion of the top plate 41 in the x-axis directions. The pair of side walls 42 has a longitudinal shape extending in the y-axis directions and is disposed on the bottom surface of the top plate 41 such that the side walls 42 face each other via the supply port 411.

The porous screen 43 has a half-cylindrical shape extending in the y-axis directions and protruding toward the −z-axis direction. In other words, the porous screen 43 includes a portion having an arc shape at any position in the y-axis directions in a cross-sectional view with the y-axis as a normal line. Accordingly, the mixture M7 is capable of smoothly moving inside the storage section 4 and it is possible to perform the agitation well. The porous screen 43 is joined to each of the side walls 42 and a space partitioned by the porous screen 43, each of the side walls 42, and the top plate 41 functions as a storage space S2 which stores the mixture M7.

In the storage section 4, the +y-axis side and the −y-axis side of the storage space S2 are blocked by wall portions (not illustrated). The wall portions support the rotating body 6 (described later) such that the rotating body 6 may rotate.

It is possible to use a mesh body or a plate having multiple through holes for the porous screen 43, for example. Accordingly, the mixture M7 inside the storage section 4 is released and dispersed to the outside of the storage space S2 via the porous screen 43. It is possible to preferentially disperse the mixture M7 having a desires fiber length to accumulate on the mesh belt 191 by setting the aperture size and the through hole size of the porous screen 43 as appropriate.

The supply section 5 is a port which is installed in the top of the top plate 41. The supply section 5 includes a port main body 51 and a connecting portion 52 provided on the port main body 51.

The port main body 51 has the shape of a box including a rectangular opening 511 on the bottom side. The opening 511 has a longitudinal rectangular shape large enough to sufficiently contain the supply port 411 of the top plate 41. The port main body 51 is installed on the top portion of the top plate 41 to communicate with the supply port 411 of the top plate 41 via the opening 511. Accordingly, it is possible to supply the mixture M7 into the storage section 4 via the supply section 5.

As illustrated in FIG. 2, the port main body 51 forms a substantially triangular shape when viewed from the x-axis directions. Therefore, when viewed in cross-section with the z-axis as the normal line, the port main body 51 widens toward the bottom side.

The connecting portion 52 is provided on the top portion of a side wall 512 on the −x-axis side of the port main body 51. The connecting portion 52 is a portion which is formed to protrude in a cylindrical shape in the −x-axis direction and the tube 172 down which the mixture M7 flows is connected to the connecting portion 52.

The mixture M7 which flows down the tube 172 first flows into the port main body 51 via the connecting portion 52. When the mixture M7 flows into the port main body 51, the mixture M7 either collides with a side wall 513 facing the side wall 512 or is transported to the vicinity of the side wall 513 by the air current. At this time, the mixture M7 is untangled to an extent and heads downward. Accordingly, even if clumps form in the mixture M7, it is possible to prevent the mixture M7 from being supplied into the storage section 4 in this state. The mixture M7 is supplied to the storage section 4 via the opening 511 and the supply port 411.

As illustrated in FIG. 3, when the mixture M7 flows into the storage section 4, as described earlier, since the mixture M7 flows downward along the side wall 513, the mixture M7 flows into the storage section 4 closer to the x-axis side than a rotational axis O. As described later, since the rotating body 6 is configured to rotate counterclockwise as viewed from the +y-axis side, the mixture M7 which flows into the storage section 4 rides the air current along the rotational direction of the rotating body 6 from this state. In other words, the supply section 5 supplied the mixture M7 which is a material along the rotational direction of the rotating body 6. Accordingly, it is possible to reduce retention of the mixture M7 in the storage section 4 and to reduce climbing up of the mixture M7 on the supply section 5 side, and it is possible to smoothly untangle the mixture M7 inside the storage section 4.

As illustrated in FIGS. 1 to 4, the rotating body 6 includes a function of promoting the dispersion of the mixture M7, which is supplied into the storage section 4, from the porous screen 43 while agitating and untangling the mixture M7 by rotating inside the storage section 4. As illustrated in FIG. 4, the rotating body 6 includes four blades 61, support members 62 supporting the blades 61, and a shaft 63 to which the support members 62 are fixed. The center axis of the shaft 63 is the rotational axis O of the rotating body 6.

Each of the blades 61 has an overall long plate shape and includes two slits 612 which penetrate the blade 61 in the thickness direction. The slits 612 extend along the extending direction of the blades 61. The slits 612 functions as openings 60 through which the mixture M7 inside the storage section 4 is capable of passing. In other words, each of the blades 61 includes three extending portions 611 extending in the longitudinal direction and two openings 60 configured by the slits 612, in which the extending portions 611 and the openings 60 are disposed to line up alternately in the width direction of the blade 61.

In the present specification, "along" naturally includes completely parallel cases, but also includes cases in which even when intersecting, the angle formed is less than or equal to 30°.

The extending portions 611 are portions which come into contact with the mixture M7 and have a plate shape. The extending portions 611 are disposed such that the thickness direction extends in an orientation intersecting the radial direction of the shaft 63, that is, the radial direction of the rotating body 6. Accordingly, the extending portions 611 are capable of coming into surface contact with the mixture M7 and are capable of efficiently performing the mixing.

As illustrated in FIGS. 4 and 5, a width W1 of each of the extending portions 611 is fixed in the longitudinal direction of the shaft 63. A width W2 of each of the slits 612 is also fixed in the longitudinal direction of the shaft 63.

Each of the blades 61 includes fixing sections 613 on both end portions for fixing the blade 61 to the support members 62. The fixing sections 613 are formed by bending both end portions of the blades 61 in substantially right angles.

The support members 62 support the blades 61 and include a function of fixing the blades 61 to the shaft 63. Two of the support members 62 are provided to be separated in the longitudinal direction of the shaft 63 and both end portions of the blades 61 are supported by the two support members 62.

Each of the support members 62 has a shape in which four longitudinal plates 621 extend radially from the center portion as viewed from the extending direction of the shaft 63. The plates 621 are oriented such that the thickness direction thereof goes along the longitudinal direction of the shaft 63.

The two support members 62 are fixed to the shaft 63 to overlap each other when viewed from the longitudinal direction of the shaft 63. In other words, each of the support members 62 has the same posture in the circumferential direction of the shaft 63. The fixing sections 613 of the blades 61 are fixed to the plates 621 which face each other in the longitudinal direction of the shaft 63.

An insertion hole 622 through which the shaft 63 is inserted is formed in the center portion of each of the support members 62 and the inner circumferential portion of the insertion hole 622 is fixed to the shaft 63.

In the illustrated configuration, although the plates 621 and the fixing sections 613 are fixed using nuts and bolts, the fixing method is not limited thereto and may be bonding such as adhesion, fusing, or welding, for example. The plates 621 and the fixing sections 613 may be formed integrally. In other words, the blades 61 and the support members 62 may be formed integrally.

When the rotating body 6 rotates, the blades 61 come into contact with and agitate the mixture M7 inside the storage section 4 and push a suitable about of the mixture M7 against the porous screen 43 while untangling the fibers. Accordingly, it is possible to disperse the mixture M7 without gaps from the entire region of the porous screen 43 while preventing the mixture M7 from clogging the porous screen 43. At this time, the mixture M7 which comes into contact with the extending portions 611 is divided by the extending portions 611 and passes through the slits 612. By repeating the dividing using the rotation of the rotating body 6, the individual fibers are untangled and it is possible to prevent the mixture M7 from assuming a state in which the fibers are tangled, that is, a state in which clumps are formed. Accordingly, the mixture M7 in which the fibers are untangled is stably dispersed via the porous screen 43. Accordingly, the dispersion amount of the mixture M7 from the dispersing section 18 stabilizes and it is possible to form the second web M8 on the mesh belt 191 in which the thickness is as uniform as possible. As a result, it is possible to prevent thickness irregularities from forming in the sheet S and it is possible to obtain the sheet S of a high quality.

It is preferable that the width W1 of each of the extending portions 611 be 5 mm to 500 mm, and more preferable that the width W1 of each of the extending portions 611 be 10 mm to 200 mm. Accordingly, it is possible to sufficiently secure the area of the portion of the entirety of the blades 61 that comes into contact with the mixture M7 and it is possible to more favorably perform the division of the mixture M7. Accordingly, it is possible to favorably perform the untangling of the mixture M7.

It is preferable that the width W2 of each of the slits 612, that is, each of the openings 60 be 3 mm to 50 mm, and more preferable that the width W2 of each of the openings 60 be 5 mm to 25 mm. Accordingly, it is possible to secure a sufficient opening area through which the mixture M7 is to pass. Accordingly, it is possible to more favorably perform the division of the mixture M7 regardless of the size of the clumps in the mixture M7. Accordingly, it is possible to favorably perform the untangling of the mixture M7.

The configuration material of the blades 61 is not particularly limited, and although it is possible to use various metal materials or the like, it is preferable that the blades 61 be configured by a resin material. Accordingly, it is possible to suppress the generation of static electricity in the mixture M7 caused by friction between the blades 61 and the mixture M7. Accordingly, it is possible to perform the untangling while effectively preventing the formation of clumps in the mixture M7.

In the present embodiment, although a description is given of a case in which the widths W1 of the extending portions 611 are the same in each of the blades 61, the widths may be different for each of the blades 61. Although the widths W1 of the extending portions 611 are the same in one blade 61, the widths may be different. In this case, when the extending portions 611 in one blade 61 are compared, it is preferable that the width W1 decreases as the distance from the shaft 63 increases. Accordingly, it is possible to more reliably perform the dividing of the mixture M7 in the vicinity of the porous screen 43 and it is possible to perform more uniform dispersion.

In the present embodiment, although a description is given of a case in which the widths W2 of the slits 612 are the same in each of the blades 61, the widths may be different for each of the blades 61. Although the widths W2 of the slits 612 are the same in one blade 61, the widths may be different. In this case, when the slits 612 in one blade 61 are compared, it is preferable that the width W2 decreases as the distance from the shaft 63 increases. Accordingly, it is possible to more reliably perform the dividing of the mixture M7 in the vicinity of the porous screen 43 and it is possible to perform more uniform dispersion.

In the present embodiment, although a description is given of a configuration in which there are four of the blades 61, the present disclosure is not limited thereto, and 1 to 3 or greater than or equal to 5 may be provided, for example.

Although a description is given of a case in which the blades 61 are provided such that the width direction thereof goes along the radial direction of the shaft 63, the present disclosure is not limited thereto and the blades 61 may be inclined.

The rotating body 6 rotates in which the blades 61 are separated from the side walls 42 and the porous screen 43. In other words, in each of the blades 61, the extending portion 611 positioned on the distal side with respect to the shaft 63 rotates in a state of being separated from the porous screen 43. Accordingly, it is possible to prevent an excessive pressure from being applied to the mixture M7 between the blades 61 and the porous screen 43 and it is possible to more favorably perform the dispersion.

It is preferable that the separation distance between the blades 61 and the porous screen 43 (the distance when the blades 61 are closest to the porous screen 43) be smaller than the width W2 of the slits 612, that is, the openings 60. Accordingly, it is possible to more effectively prevent the clogging of the porous screen 43. The separation distance between the blades 61 and the porous screen 43 (the distance when the blades 61 are closest to the porous screen 43) may be 0 mm, that is, the blades 61 may come into contact with the porous screen 43.

As described earlier, the communicating port 412 which communicates the inside with the outside of the storage section 4 is provided in the top plate 41 of the storage section 4. The communicating port 412 includes a function of supplying air to the inside of the storage section 4. The communicating port 412 is positioned closer to the +x-axis side than the supply port 411 and closer to the −x-axis side than the side wall 42 of the +x-axis side. Therefore, it is possible to supply air to the inside of the storage section 4, that is, to the storage space S2.

When the suction section 193 operates, although the air of the inside the housing 3, that is, the air of the space S1 is suctioned downward and the space S1 assumes a negative pressure, the air is capable of flowing into the storage section 4, that is, the storage space S2 via the communicating port 412. The air which flows in is capable of flowing into the space S1 via the porous screen 43. In this manner, due to the communicating port 412 being provided, it is possible to form an air current which passes through the communicating port 412, the storage space S2, and the space S1 as illustrated by arrows in FIG. 3. Accordingly, it is possible to favorably perform the untangling of the mixture M7 in the storage space S2 and the dispersion of the mixture M7 via the porous screen 43. As a result, it is possible to favorably perform the accumulation of the mixture M7, it is possible to form the second web M8 in which the thickness is as uniform as possible, and thus, it is possible to form the sheet S in which the thickness is as uniform as possible.

The communicating port 412 is provided closer to the +x-axis side than the rotational axis O. In other words, the communicating port 412 is provided on a more distal side than the supply port 411 with respect to the rotational axis O which is the rotational center of the rotating body 6. Therefore, the air which flows into the storage section 4 via the communicating port 412 rides the air current along the rotational direction of the rotating body 6 from this state. In other words, the communicating port 412 supplies the air along the rotational direction of the rotating body 6. Accordingly, it is possible to prevent the retention of the mixture M7 in the storage section 4 and to smoothly untangle the mixture M7 inside the storage section 4.

The communicating port 412 is configured to supply air into the storage section 4 through the suction force of the suction section 193. In other words, the communicating port 412 is configured to supply air into the storage section 4 using the suction force of the suction section 193. Accordingly, it is possible to omit the separate provision of an air blowing source or the like which supplies the air from the communicating port 412 and it is possible to obtain a simplification of the apparatus configuration.

As described above, the fiber material accumulating apparatus 10 is provided with the storage section 4, the supply section 5, and the rotating body 6. The storage section 4 includes the porous screen 43, the supply section 5 supplies the mixture M7 which is a material containing fibers to the storage section 4, and the rotating body 6 is provided inside the storage section 4 and includes the blades 61 which rotate to agitate the mixture M7. The blades 61 include the extending portions 611 extending along the rotational axis O directions of the rotating body 6 and the openings 60 through which the mixture M7 is capable of passing when the blades 61 rotate.

The blades 61 include a plurality of the extending portions 611 which are separated in a direction intersecting the rotational axis O of the rotating body 6 and the slits 612 which are the gaps between the extending portions 611 functions as the openings 60.

According to the present disclosure, as illustrated in FIGS. 5 and 6, the mixture M7 which contacts the extending portions 611 through the rotation of the rotating body 6 is divided by the extending portions 611 and passes through the slits 612, that is, the openings 60. By repeating the dividing, the individual fibers are untangled and it is possible to prevent the mixture M7 from assuming a state in which clumps are formed. Accordingly, the mixture M7 in which the fibers are untangled is stably dispersed via the porous screen 43. Accordingly, the dispersion amount of the mixture M7 from the dispersing section 18 stabilizes and it is possible to form the second web M8 on the mesh belt 191 in which the thickness is as uniform as possible. As a result, it is possible to prevent thickness irregularities from forming in the sheet S and it is possible to obtain the sheet S of a high quality.

The fiber material accumulating apparatus 10 includes the mesh belt 191 on which the mixture M7 dispersed via the porous screen 43 accumulates and the suction section 193 provided on the opposite side of the mesh belt 191 from the storage section 4. Accordingly, it is possible to form the second web M8 having less error with respect to the set thickness distribution due to a combination of being capable of promoting the accumulation of the mixture M7 on the mesh belt 191 and the stable dispersion of the mixture M7 from the porous screen 43 described earlier.

The sheet manufacturing apparatus 100 is provided with the fiber material accumulating apparatus 10 and the sheet shaping section 20 which shapes the second web M8 formed by the fiber material accumulating apparatus 10 into a sheet shape. Accordingly, it is possible to manufacture the sheet S while benefiting from the previously-described merits.

Second Embodiment

Figure 7:
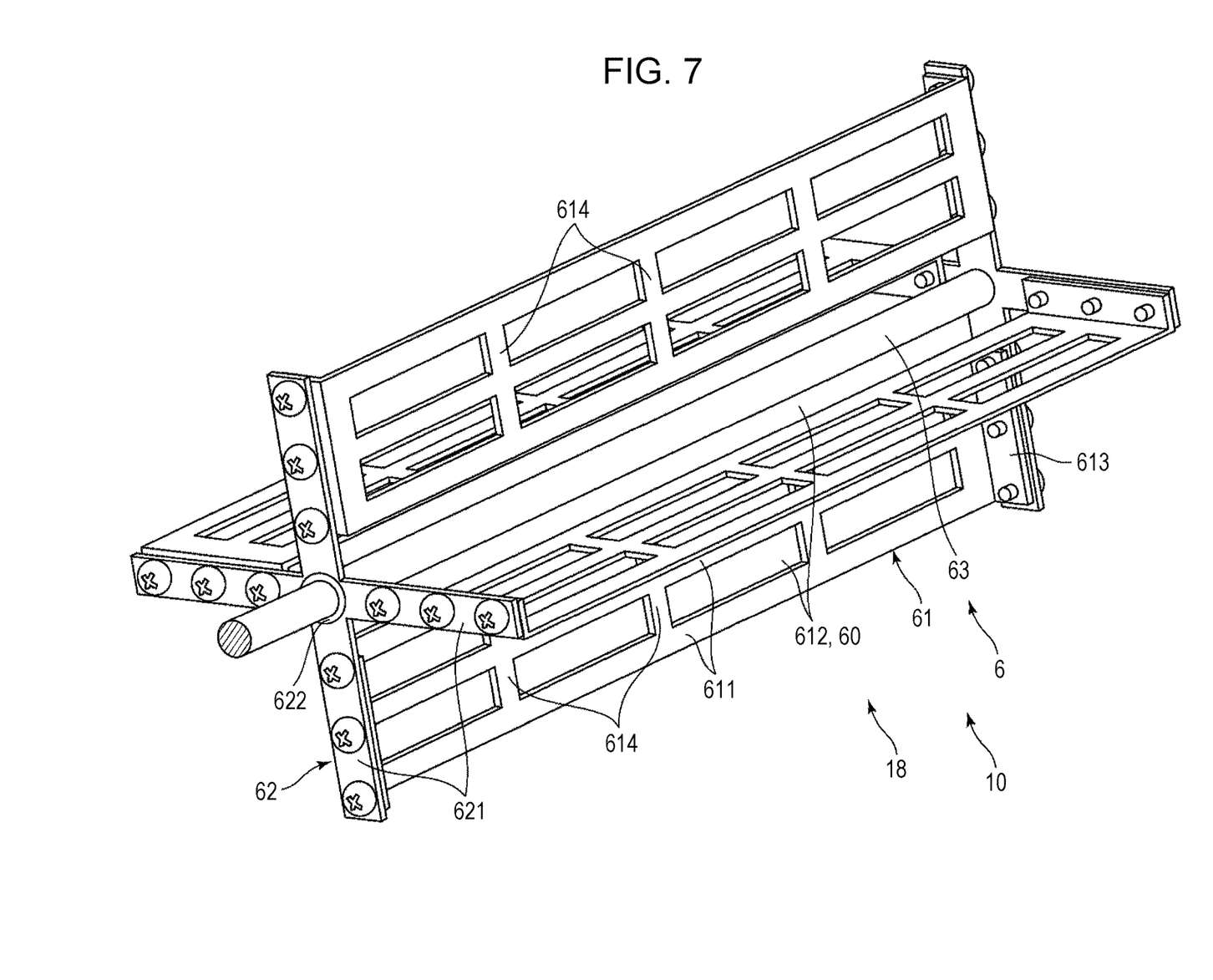
FIG. 7 is a perspective view of a rotating body provided in a dispersing section of a second embodiment of a fiber material accumulating apparatus and a sheet manufacturing apparatus of the present disclosure.

FIG. 7 is a perspective view of a rotating body provided in a dispersing section of a second embodiment of a fiber material accumulating apparatus and a sheet manufacturing apparatus of the present disclosure.

Hereinafter, a description will be given of the second embodiment of the fiber material accumulating apparatus and the sheet manufacturing apparatus of the present disclosure with reference to the drawings and the description will be given centered on the points which differ from the previously-described embodiments, omitting the description of items which are the same.

The present embodiment is the same as the first embodiment except that the shape of the blades is different.

As illustrated in FIG. 7, each of the blades 61 includes joining portions 614 which join the extending portions 611. Three of the joining portions 614 are provided between each pair of the extending portions 611 adjacent to each other in the radial direction of the rotating body 6. The joining portions 614 are disposed to be separated from each other. Therefore, each of the slits 612, that is, each of the openings 60 is configured to be divided into four.

As described in the first embodiment, although when the rotating body 6 rotates, the mixture M7 is divided in the radial direction of the rotating body 6 when passing through the slits 612, in the present embodiment, the mixture M7 is further divided in the rotational axis O directions by the joining portions 614. Accordingly, it is possible to more effectively prevent the mixture M7 from assuming a state in which clumps are formed and it is possible to more favorably perform the agitation and untangling of the mixture M7.

Third Embodiment

Figure 8:
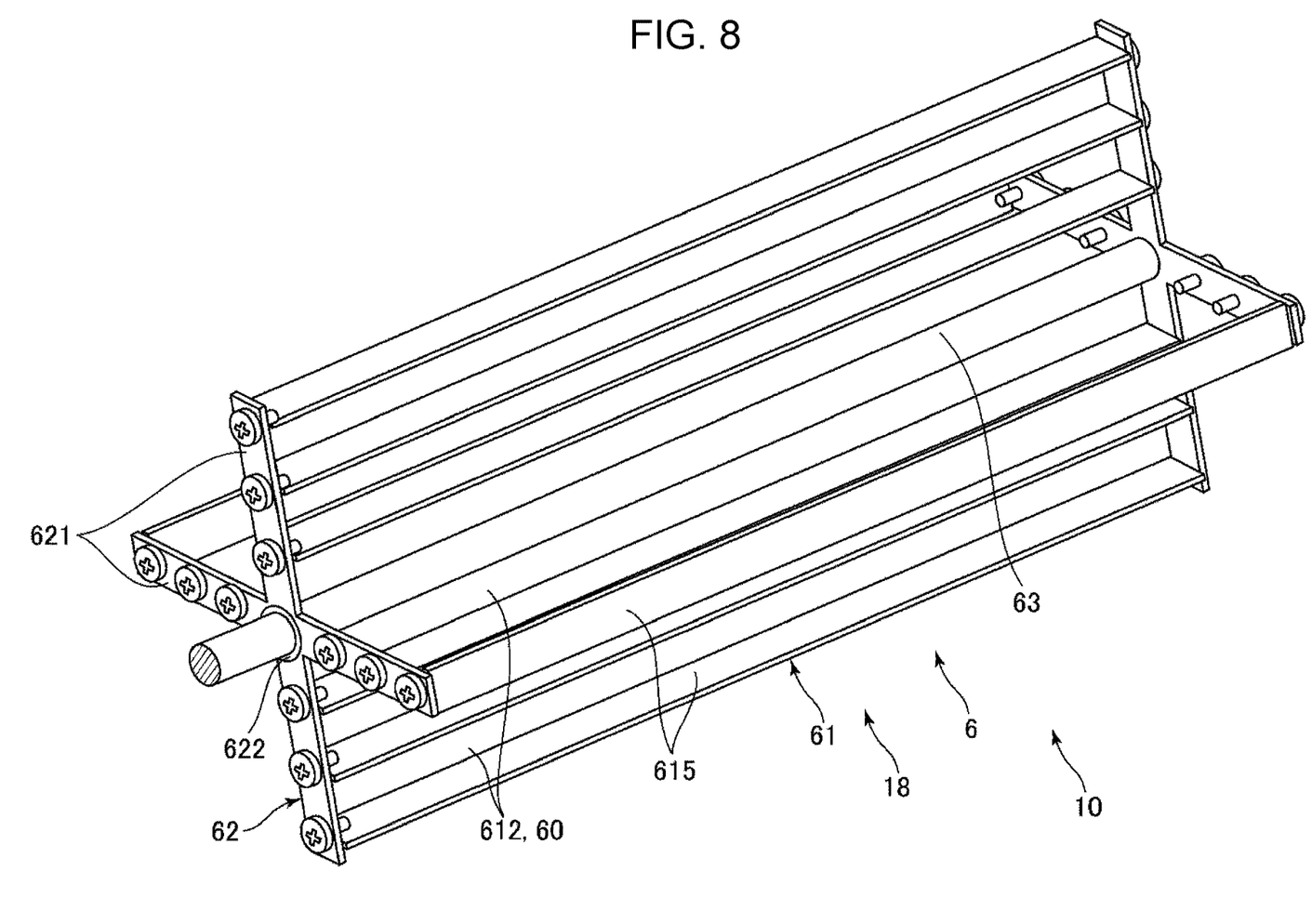
FIG. 8 is a perspective view of a rotating body provided in a dispersing section of a third embodiment of a fiber material accumulating apparatus and a sheet manufacturing apparatus of the present disclosure.

FIG. 8 is a perspective view of a rotating body provided in a dispersing section of a third embodiment of a fiber material accumulating apparatus and a sheet manufacturing apparatus of the present disclosure.

Hereinafter, a description will be given of the third embodiment of the fiber material accumulating apparatus and the sheet manufacturing apparatus of the present disclosure with reference to the drawings and the description will be given centered on the points which differ from the previously-described embodiments, omitting the description of items which are the same.

The present embodiment is the same as the first embodiment except that the shape of the blades is different.

As illustrated in FIG. 8, each of the blades 61 includes a plurality of plate-shaped extending portions 615. The extending portions 615 are supported on both end portions by the support members 62. Each of the extending portions 615 is supported independently by the support members 62.

In present embodiment, each of the extending portions 615 is disposed such that the thickness direction thereof is oriented along the radial direction of the shaft 63. The spaces between the extending portions 615 and the spaces between the extending portions 615 on the proximal side to the shaft 63 and the shaft 63 function as the openings 60. According to the present embodiment, since it is possible to secure a greater area of the openings 60 and the side surfaces of the extending portions 615 perform division as described earlier to come into contact with the mixture M7, it is possible to more securely perform the division regardless of the extent of the tangling between the fibers.

Since each of the extending portions 615 is configured to be independently supported by the support members 62, for example, it is possible to adopt a configuration in which each of the extending portions 615 may be attachable and removable with respect to the support members 62. Accordingly, for example, it is possible to select, as appropriate, the number of the extending portions 615 to install according to the strength of the sheet S, that is, the length of the fibers of the mixture M7 or the like and to adjust the degree of agitating and untangling of the mixture M7.

Fourth Embodiment

Figure 9:
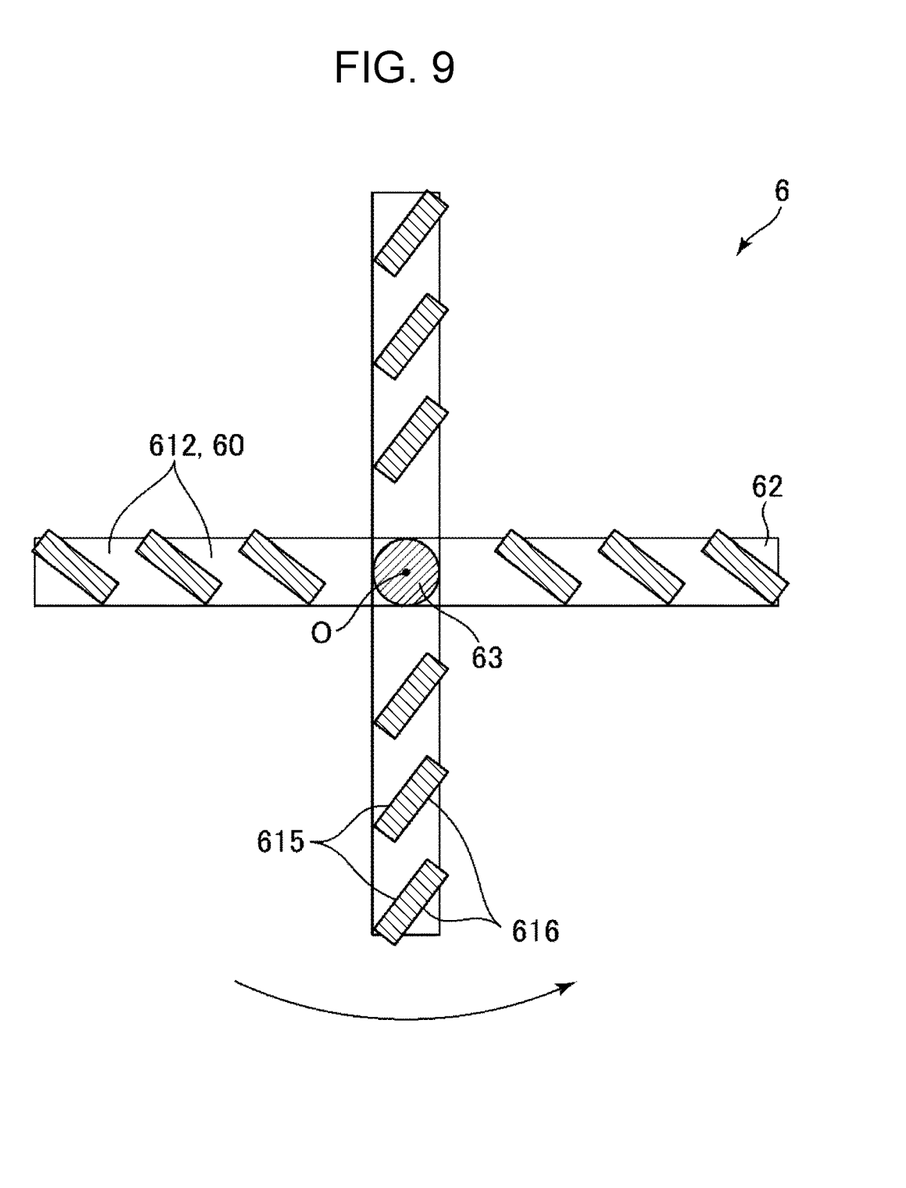
FIG. 9 is a lateral sectional diagram of a rotating body provided in a dispersing section of a fourth embodiment of a fiber material accumulating apparatus and a sheet manufacturing apparatus of the present disclosure.

FIG. 9 is a lateral sectional diagram of a rotating body provided in a dispersing section of a fourth embodiment of a fiber material accumulating apparatus and a sheet manufacturing apparatus of the present disclosure.

Hereinafter, a description will be given of the fourth embodiment of the fiber material accumulating apparatus and the sheet manufacturing apparatus of the present disclosure with reference to the drawings and the description will be given centered on the points which differ from the previously-described embodiments, omitting the description of items which are the same.

The present embodiment is the same as the third embodiment except that the shape of the blades is different.

As illustrated in FIG. 9, the extending portions 615 are disposed such that the thickness direction is inclined at an orientation intersecting the radial direction of the shaft 63, that is, the radial direction of the rotating body 6. Specifically, a main surface 616 of the distal side of each of the extending portions 615 with respect to the shaft 63 is inclined to face forward in the rotational direction. The extending portions 615 are disposed to be inclined in the same direction.

In the present embodiment, similar effects to those of the previously-described embodiments may be obtained. When the mixture M7 is divided by the extending portions 615 and passes through the openings 60, the path of the mixture M7 is modified to the outer circumferential side in the radial direction of the rotating body 6 by the inclined extending portions 615. Accordingly, although not illustrated, it is possible to suitably press the mixture M7 against the porous screen 43 side and it is possible to promote the dispersion of the mixture M7 from the porous screen 43.

Fifth Embodiment

Figure 10:
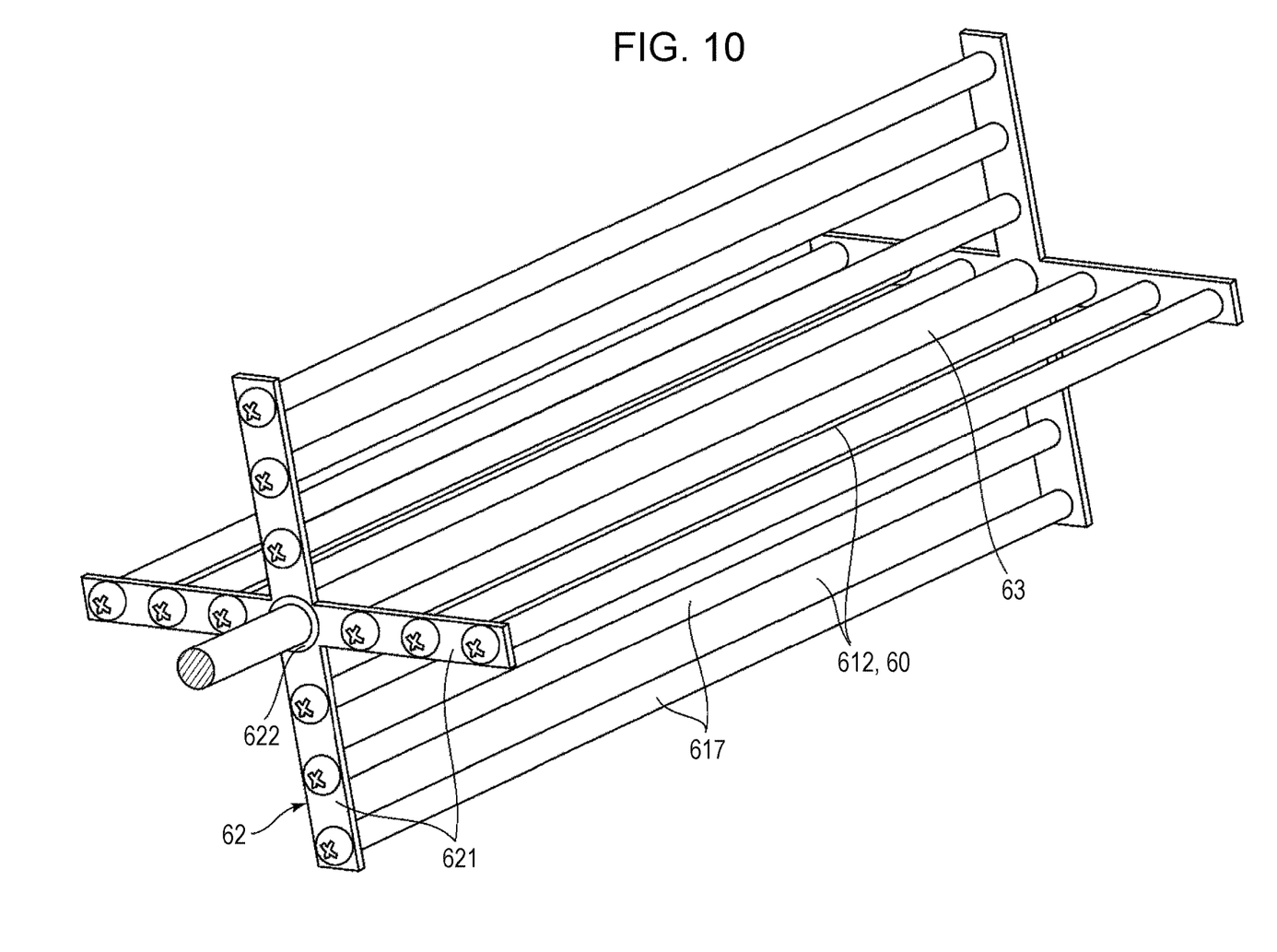
FIG. 10 is a perspective view of a rotating body provided in a dispersing section of a fifth embodiment of a fiber material accumulating apparatus and a sheet manufacturing apparatus of the present disclosure.

FIG. 10 is a perspective view of a rotating body provided in a dispersing section of a fifth embodiment of a fiber material accumulating apparatus and a sheet manufacturing apparatus of the present disclosure.

Hereinafter, a description will be given of the fifth embodiment of the fiber material accumulating apparatus and the sheet manufacturing apparatus of the present disclosure with reference to the drawings and the description will be given centered on the points which differ from the previously-described embodiments, omitting the description of items which are the same.

The present embodiment is the same as the third embodiment except that the shape of the blades is different.

As illustrated in FIG. 10, an extending portion 617 has a round rod shape. In other words, the horizontal cross-sectional shape of the extending portion 617 is circular across the entire region in the longitudinal direction. Accordingly, the mixture M7 which comes into contact with the extending portions 617 is smoothly dispersed to slide on the outer circumferential portions of the extending portions 617. Accordingly, for example, the fiber diameters of the mixture M7 are comparatively thin, and even if the fibers have a comparatively low strength, it is possible to perform the agitation and the untangling while preventing or suppressing the cutting of the fibers.

Hereinabove, although a description is given of the fiber material accumulating apparatus and the sheet manufacturing apparatus of the present disclosure with respect to the depicted embodiments, the present disclosure is not limited thereto, and it is possible to replace the parts which configure the fiber material accumulating apparatus and the sheet manufacturing apparatus with parts of a predetermined configuration that may exhibit similar functions. A predetermined configuration object may be added.

The fiber material accumulating apparatus and the sheet manufacturing apparatus of the present disclosure may be a combination of greater than or equal to two predetermined configurations or characteristics of the embodiments.

What is claimed is:

1. A fiber material accumulating apparatus comprising:
   a storage section which includes a porous screen;
   a supply section which supplies a material containing fibers to the storage section;
   a rotating body which is provided inside the storage section and includes a blade which rotates to agitate the material; and
   a belt on which the material dispersed via the porous screen accumulates, wherein
   the blade includes
      an extending portion that includes a longest dimension of the blade extending parallel to a rotational axis of the rotating body,
      a plurality of extending portions separated in a direction intersecting the rotational axis, the extending portions including the extending portion, and
      an opening through which the material passes when the blade rotates, a gap between the extending portions functioning as the opening.

2. The fiber material accumulating apparatus according to claim 1, wherein
   the extending portions have a plate shape.

3. The fiber material accumulating apparatus according to claim 2, wherein
   the extending portions are disposed such that a thickness direction extends along a radial direction of the rotating body.

4. The fiber material accumulating apparatus according to claim 2, wherein
   the extending portions are disposed such that a thickness direction is oriented to intersect a radial direction of the rotating body.

5. The fiber material accumulating apparatus according to claim 1, wherein
   the extending portions have a round rod shape.

6. The fiber material accumulating apparatus according to claim 1, wherein
   the rotating body rotates in a state of being separated from the porous screen.

7. The fiber material accumulating apparatus according to claim 1, wherein
   the porous screen includes a portion having an arc shape in a cross-sectional view.

8. The fiber material accumulating apparatus according to claim 1, further comprising:
   a housing which covers a portion between the storage section and a belt and in which an opening is formed at a position facing the belt.

9. The fiber material accumulating apparatus according to claim 1, wherein the belt is a mesh belt, and further comprising:
   a suction section provided on a side of the mesh belt opposite to the storage section.

10. A sheet manufacturing apparatus comprising:
    the fiber material accumulating apparatus according to claim 1; and
    a shaping section which shapes accumulated matter formed by the fiber material accumulating apparatus into a sheet shape.

* * * * *